3,176,004
6-DEOXY-6-MERCAPTO-D-GLUCOSAMINE AND A PROCESS FOR THE PREPARATION OF THIS COMPOUND

Hiroshi Ogawa, Setagaya-ku, Tokyo, and Teiichiro Ito, Bunkyo-ku, Tokyo, Japan, assignors to Meiji Seika Kaisha, Ltd., Tokyo, Japan, a corporation of Japan
No Drawing. Filed Mar. 20, 1962, Ser. No. 182,966
Claims priority, application Japan, Mar. 22, 1961, 36/9,382
5 Claims. (Cl. 260—211)

This invention relates to a new organic compound 6-deoxy-6-mercapto-D-glucosamine, and to a process for the preparation of the same compound of the following structural formula

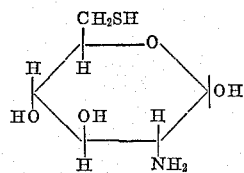

As will be clear from the above structural formula, 6-deoxy-6-mercapto-D-glucosamine is such a compound in which a hydroxyl group in 6-position of glucosamine has been replaced by a mercapto group.

Glucosamine has been used as a medicine since it is likely to form a chelate compound with metal and consequently it shows the actions of enhancing the medicinal activity of general, chemotherapeutic agents and antibiotics, suppressing an early excretion of them and also reducing a decrease in the activity of the medicines when the glucosamine is administered together with the chemotherapeutic agents and antibiotics.

6-deoxy-6-mercapto-D-glucosamine according to the present invention shows the higher capacity to form the chelate than said glucosamine because the mercapto group can much easily combine with metal ions than the hydroxyl group present in the glucosamine. Accordingly, 6-deoxy-6-mercapto-D-glucosamine exhibits the same actions as the glucosamine and may be applied as a toxicide, too.

According to another feature of the present invention, we provide a process for the preparation of 6-deoxy-6-mercapto-D-glucosamine which comprises reacting an alkali metal thioacetate such as potassium and sodium thioacetates with N-anisylidene-1,3,4-tri-O-acetyl-6-O-tosyl-β-D-glucosamine (Formula I below) in a solvent to give N-anisylidene-1,3,4-tri-O-acetyl-6-deoxy-S-acetyl-6-thio-β-D-glucosamine (Formula II below), then reacting an acid therewith in a solvent to form a salt of the acid with 1,3,4-tri-O-acetyl-6-deoxy-S-acetyl-6-thio-β-D-glucosamine (Formula III below), and finally deacetylating this compound, for example, by treating with a solvent containing an amount of an acid to split off the acetyl group from the compound (III), whereby 6-deoxy-6-mercapto-D-glucosamine (Formula IV below) is produced. The synthetic route is represented by the following series of reactions:

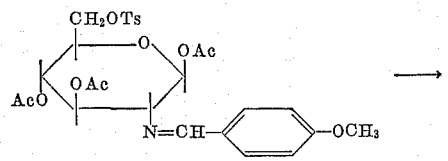

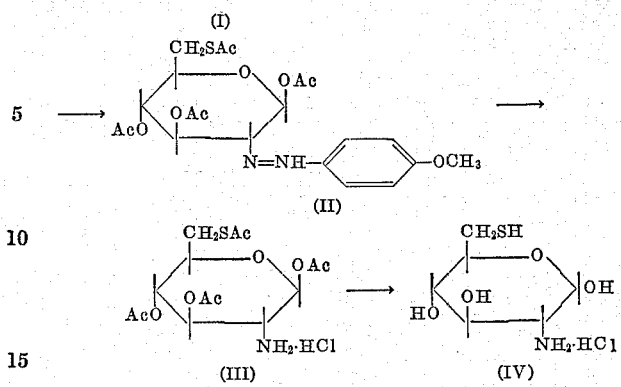

where

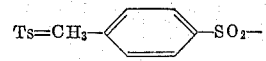

and Ac=CH₃CO—.

N-anisylidene-1,3,4-tri-O-acetyl-6-O-tosyl-β-D-glucosamine (I) which is used as the starting material in the process of the invention may be synthesized from N-anisylidene-D-glucosamine as described, for example, in Helv. Chim. Acta., vol. 41, 1501 (1958). This N-anisylidene-D-glucosamine may be substantially quantitatively prepared by reacting anisaldehyde with D-glucosamine. According to the present invention, therefore, the final product 6-deoxy-6-mercapto-D-glucosamine can be easily produced in a higher yield owing to the selection of N-anisylidene-1,3,4-tri-O-acetyl-6-O-tosyl-β-D-glucosamine as the starting material.

The present invention is explained below in more detail.

If an alkali metal thioacetate such as potassium and sodium thioacetates is reacted with N-anisylidene-1,3,4-tri-O-acetyl-6-O-tosyl-β-D-glucosamine (I) in an organic solvent such as acetone, N-anisylidene-1,3,4-tri-O-acetyl-6-deoxy-S-acetyl-6-thio-β-D-glucosamine (II) may be obtained in a yield of 70 to 80%. This substance is such a novel compound as described in example below.

When the above compound (II) is then treated with an inorganic or organic acid, for example, with hydrochloric acid in acetone or other suitable organic solvent, there is substantially quantitatively precipitated 1,3,4-tri-O-acetyl-6-deoxy-S-acetyl-6-thio-β-D-glucosamine hydrochloride (III). This substance is also new as described in example.

When this compound is finally subjected to a deacetylation treatment, for example, by heating it together with hydrochloric acid and methanol to boiling, there is obtained 6-deoxy-6-mercapto-D-glucosamine (IV).

This 6-deoxy-6-mercapto-D-glucosamine hydrochloride is a new substance which has not yet been described in the literature. The compound is a white crystal or crystalline powder which is readily soluble in water and melts at 180° C. with decomposition. The specific rotatory power is $[\alpha]_D^{19} + 98° \rightarrow +76°$ (after 5 hours) (c., 1.2% in water). The color reaction shows that the compound (IV) is positive for the nitroprusside test and red tetrazolium test. The infrared absorption spectrum of the compound (IV) shows an absorption band at 2555 cm.⁻¹, characteristic of SH group.

The invention is further illustrated with reference to example which does not limit the scope of the invention.

Example

A solution of 3 g. of N-anisylidene-1,3,4-tri-O-acetyl-6-O-tosyl-β-D-glucosamine (I) and 1.5 g. of dry potassium thioacetate in 50 ml. of acetone was refluxed for 6 hours.

The solid was filtered off and washed with acetone, then the filtrate and washings were evaporated to dryness in vacuo. The residue was dissolved in chloroform and washed with a little water, and the resulting solution is then dehydrated by means of anhydrous sodium sulfate and subsequently evaporated in vacuo to dryness. Recrystallization of the residue from methanol gave needle crystals of N-anisylidene-1,3,4-tri-O-acetyl-6-deoxy-S-acetyl-6-thio-$\beta$-D-glucosamine (II). Yield 1.8 g., melting point 162°, $[\alpha]_D^{20}$ +84° (in water).

*Analysis.*—Found: C, 54.72; H, 5.49; N, 3.01; S, 5.96. Calculated for $C_{22}H_{27}NSO_9$: C, 54.88; H, 5.65; N, 2.91; S, 6.66%.

A solution of 2 g. of the above compound (II) in 50 ml. of acetone was heated to boiling, and to this solution 1 ml. of 5 N aqueous hydrochloric acid was added. On immediately cooling the solution, the crystalline precipitate was formed. The precipitate was filtered and dried to yield 1.4 g. of 1,3,4-tri-O-acetyl-6-deoxy-S-acetyl-6-thio-$\beta$-D-glucosamine hydrochloride (III). Recrystallization of this compound from ethanol gave a pure product, M.P. 210–220° C. (with decomposition), $[\alpha]_D^{17}$ −3.9° (in water).

*Analysis.*—Found: C, 42.45; H, 5.75; N, 3.39. Calculated for $C_{14}H_{21}NO_8S \cdot HCl$: C, 42.05; H, 5.55; N, 3.50%.

0.6 g. of the above compound (III) were then added with 25 ml. of N-methanolic hydrogen chloride and the mixture was refluxed for 4 hours under $CO_2$ gas. The solution was concentrated in vacuo to form 6-deoxy-6-mercapto-D-glucosamine hydrochloride as needle crystals. The yield was 0.24 g. It showed M.P. 180° C. (with decomposition).

*Analysis.*—Found: C, 31.25; H, 5.89; N, 5.92. Calculated for $C_6H_{13}NO_4S \cdot HCl$: C, 31.10; H, 6.09; N, 6.05%.

What we claim is:

1. 6-deoxy-6-mercapto-D-glucosamine.

2. A process for the preparation of 6-deoxy-6-mercapto-D-glucosamine which comprises reacting an alkali metal thioacetate selected from the group consisting of potassium and sodium thioacetates with N-anisylidene-1,3,4-tri-O-acetyl - 6 - O-tosyl-$\beta$-D-glucosamine to give N-anisylidene-1,3,4-tri-O-acetyl-6-deoxy-S-acetyl-6 - thio - $\beta$-D-glucosamine, then reacting hydrochloric acid therewith to form a salt of the acid with 1,3,4-tri-O-acetyl-6-deoxy-S acetyl-6-thio-$\beta$-D-glucosamine and finally deacetylating this compound.

3. A process for the preparation of 6-deoxy-6-mercapto-D-glucosamine which comprises reacting an alkali metal thioacetate selected from the group consisting of potassium and sodium thioacetates with N-anisylidene-1, 3,4-tri-O-acetyl-6-O-tosyl-beta-D-glucosamine to give N-anisylidene-1,3,4-tri-O-acetyl-6 - deoxy-S-acetyl - 6 - thio-beta-D-glucosamine, then reacting hydrochloric acid therewith to form a salt of the acid with 1,3,4-tri-O-acetyl-6-deoxy-S-acetyl - 6 - thio-beta-D-glucosamine, and finally deacetylating this compound by heating with hydrochloric acid and methanol.

4. In the process for the preparation of 6-deoxy-6-mercapto-D-glucosamine which comprises reacting an alkali metal thio-acetate selected from the group consisting of potassium and sodium thioacetates with N-anisylidene-1,3,4-tri-O-acetyl-6-O-tosyl-beta-D-glucosamine to give N-anisylidene-1,3,4-tri-O-acetyl-6-deoxy-S-acetyl-6-thio-beta-D-glucosamine, acidifying the latter compound to form an acid salt of 1,3,4-tri-O-acetyl-6-deoxy-S-acetyl-6-thio-beta-D-glucosamine.

5. The process of claim 4 wherein the salt is deacetylated to form the 6-deoxy-6-mercapto-D-glucosamine.

References Cited in the file of this patent

Ito: "Agr. Biol Chem.," vol. 25, No. 7, pp. 585–587, July 1961.

Ito: Chem. Abst., vol. 55, 1961, p. 25773.